United States Patent
Gustafsson et al.

(10) Patent No.: US 8,192,846 B2
(45) Date of Patent: Jun. 5, 2012

(54) COMPOSITION AND MANUFACTURING PROCESS OF A DECORATIVE SURFACE COVERING

(75) Inventors: Peter Gustafsson, Ronneby (SE); Roland Karlsson, Ronneby (SE); Helena Martensson, Sturkö (SE)

(73) Assignee: Tarkett SAS, Nanterre (FR)

( * ) Notice: Subject to any disclaimer, the term of this patent is extended or adjusted under 35 U.S.C. 154(b) by 460 days.

(21) Appl. No.: 12/514,242

(22) PCT Filed: Jan. 11, 2008

(86) PCT No.: PCT/EP2008/000171
§ 371 (c)(1),
(2), (4) Date: May 8, 2009

(87) PCT Pub. No.: WO2008/083973
PCT Pub. Date: Jul. 17, 2008

(65) Prior Publication Data
US 2010/0003527 A1    Jan. 7, 2010

(30) Foreign Application Priority Data

Jan. 12, 2007   (EP) ................................. 07000622

(51) Int. Cl.
*B32B 27/00* (2006.01)
*B32B 27/42* (2006.01)
(52) U.S. Cl. ................ 428/542.2; 428/500; 428/522; 524/505

(58) Field of Classification Search .............. 428/500, 428/522, 542.2; 524/426, 437, 445, 505
See application file for complete search history.

(56) References Cited

U.S. PATENT DOCUMENTS

| 2002/0168500 A1 | 11/2002 | Graab et al. | |
| 2006/0229411 A1 * | 10/2006 | Hatfield et al. | ........ 525/88 |

FOREIGN PATENT DOCUMENTS

| EP | 1 361 249 A2 | 11/2003 |
| EP | 1 616 923 A1 | 1/2006 |
| GB | 2 168 362 A | 6/1986 |
| WO | WO 97/10298 A1 | 3/1997 |
| WO | WO 2006/005752 A1 | 1/2006 |
| WO | WO 2006/107763 A2 | 10/2006 |

\* cited by examiner

*Primary Examiner* — Thao T. Tran
(74) *Attorney, Agent, or Firm* — Reinhart Boerner Van Deuren P.C.

(57) ABSTRACT

The present invention relates to a decorative surface covering obtainable by a vulcanisable composition, said composition comprising a first polymer component consisting of styrene butadiene styrene block copolymer (SBS); a second polymer component selected from the group consisting of a random or partially random copolymer of butadiene and styrene (SBR), and nitrile butadiene rubber (NBR); a third polymer component consisting of a high styrene content styrene butadiene copolymer (HSR), a filler, a vulcanisation system and additives selected from the group consisting of processing aids, stabilizers, pigments and compatibilizers.

19 Claims, No Drawings

COMPOSITION AND MANUFACTURING PROCESS OF A DECORATIVE SURFACE COVERING

CROSS-REFERENCE TO RELATED PATENT APPLICATIONS

This patent application is the National Stage of International Application No. PCT/EP2008/000171, filed Jan. 11, 2008, that claims the benefit of European Application No. 07000622.6, filed Jan. 12, 2007, the entire teachings and disclosure of which are incorporated herein by reference thereto.

FIELD OF THE INVENTION

The present invention relates to a composition for decorative surface coverings and to a manufacturing process for said compositions.

INTRODUCTION AND STATE OF THE ART

Synthetic decorative surface coverings such as floor coverings are generally based on PVC and have been known for decades. The key features of this kind of materials are essentially abrasion resistance (resistance to scratches), dimensional stability, absence of creeping, low smell, stain resistance and tear resistance.

In the last years, environmental issues on PVC coverings such as VOC (Volatile Organic Compounds) release, plasticizers and thermal stabilizers toxicity has motivated the floor covering industry to put search efforts on PVC alternatives. These alternative compositions should nevertheless preferably be convertible on conventional PVC equipment in particular on PVC extruders.

Vulcanisable standard rubber floor covering compositions generally comprise less than 30 wt % rubber internally mixed with about 60 wt % of fillers and less than about 10 wt % of curing agents and processing aids. Rubber floor coverings are known to be less tear and stain resistant than PVC floorings. Additionally, conventional PVC equipment cannot manage these compositions.

Document WO 97/010298 discloses a flooring material based on crosslinked polyolefin's and unsaturated silane compounds. The floor covering composition comprises various additives and is free of organic fillers.

Document WO 2006/005752 discloses a large variety of possible compositions combining a series of elastomers, thermoplastics and a high styrene resin cured with conventional curing systems like TBBS, ZBEC, CBS, sulphur, stearic acid and zinc oxide. The composition disclosed in the examples cannot be extruded on conventional PVC extruders, it sticks on the steel belts and can only be worked in a steel belt press in combination with silicon release paper. Furthermore, the obtained granules have a strong tendency to agglomerate in the transport containers. An additional drawback is the absence of flame retardant filler and the high production cost.

US 2002/0168500 A1 discloses an electrically conductive floor covering using a combination of a high styrene resin (HSR) and SBR rubber together with high amounts of carbon black. This composition cannot be worked on conventional extruders, making rubber equipment necessary.

EP 1 361 249 A2 discloses a substantially halogen-free thermoplastic elastomer composition for decorative surface coverings comprising a dynamically vulcanized blend of epoxydized rubbers such as natural rubber, EPDM, NBR and SBR, ionomers and diluent polymers. In this composition the use of SBS, SBR or HSR with specific styrene contents are not disclosed and rubber equipment is used for the mixing of the different ingredients.

Aim of the Invention

The present invention aims to provide an improved composition for a substantially halogen-free decorative surface covering which overcomes the drawbacks of the prior art and which is convertible on conventional PVC extrusion equipment.

SUMMARY OF THE INVENTION

The present invention discloses a decorative surface covering obtainable by a vulcanisable composition, said composition comprising:
- a first polymer component consisting of styrene butadiene styrene block copolymer;
- a second polymer component selected from the group consisting of nitrile butadiene rubber and a random or partially random copolymer of butadiene and styrene having 40 wt % or less of bound styrene;
- a third polymer component consisting of a high styrene content styrene butadiene copolymer containing at least 55 wt % of bound styrene;
- a filler;
- a vulcanisation system;
- additives selected from the group consisting of processing aids, stabilizers, pigments and compatibilizers.

According to particular embodiments, the present invention may comprise one or a combination of any of the following characteristics:
- the decorative surface covering further comprises a fourth polymer component consisting of an ionomer.
- the ionomer represents between 3 to 12 wt % of the total weight of the polymers.
- the ionomer is a partially or totally neutralised ethylene/methacrylic acid incorporating a third comonomer.
- the first polymer component is a styrene butadiene styrene block copolymer containing 35 to 45 wt % of bound styrene.
- the first polymer component is a styrene butadiene styrene block copolymer containing 40 wt % of bound styrene.
- the second polymer component is a random or a partially random copolymer of butadiene and styrene, containing 25 wt % of bound styrene.
- The third polymer component is a high styrene content styrene butadiene copolymer containing between 63 and 83 wt % of bound styrene.
- the third polymer component is a high styrene content styrene butadiene copolymer containing 63 wt % of bound styrene.
- the decorative surface covering composition comprises the following wt % relative to the total amount of the ingredients:
    - 5 to 30 wt % of the first polymer component;
    - 5 to 20 wt % of the second polymer component;
    - 5 to 30 wt % of the third polymer component.
- the filler is selected from the group consisting of aluminium trihydrate, silica, clay, dolomite and calcium carbonate.
- the decorative surface covering composition comprises between 25 and 45 wt % of filler.
- the decorative surface covering composition is substantially halogen-free.

the vulcanisation system is selected from the group consisting of sulphur, stearic acids, zinc oxide, sulfenamides and thiocarbamate or combinations thereof the surface covering additionally comprises a polyurethane-based top coating.

the polyurethane-based top coating is a polyurethane acrylate.

The present invention further discloses a process for manufacturing the decorative surface covering of the invention comprising the following steps:

performing a first dry mix comprising all the polymer components;

performing a second dry mix comprising the fillers, the vulcanisation system, the stabilisers, the pigments and the processing aids;

mixing the first and second dry mix in an extruder wherein the mass temperature does not exceed 120° C. and granulating it to a specific colour batch;

repeating the extruder mixing step with different colours to achieve various colour batches;

performing a dry mix of the various colour batches;

feeding the dry mix comprising the various colour batches in a double belt press and heat it up to at least 160° C. to vulcanise it.

In particular embodiments of the present invention, the step of dry mix comprising the various colour batches comprises the adding of additionally virgin styrene butadiene styrene granules.

Advantageously, an additional polyurethane-based top coating is applied as a finish on the decorative surface covering.

DETAILED DESCRIPTION OF THE INVENTION

Decorative coverings include any design covering that provide an enhanced appearance to a substrate. These can include wall and floor coverings as well as ceilings.

The expression "substantially halogen-free" has to be understood as devoid of any halogen-containing polymer. This does not exclude the presence of impurities or additives in a concentration of less than 1%.

The expression "polymer component" has to be understood as a distinguishable polymer family which is part of the global composition such as the filler, vulcanisation system and additives.

The composition of the decorative surface covering of the present invention is in its final state a vulcanised composition wherein all the vulcanisable components are at least partly vulcanised and wherein a vulcanisation system has reacted and does not any longer exist as such. Therefore the present invention discloses a vulcanisable composition which is the precursor of the vulcanised finished decorative surface covering.

One of the key advantages of the invention is the processing of the mixture at the extruding step which is part of a conventional PVC process. Indeed, the usual rubber formulations need to be performed through internal mixers due to the high viscosity below the vulcanisation temperature. A conventional rubber could never be processed using an extruder at temperatures around 120° C., i.e. at temperature ranges that would avoid vulcanisation. The role of the thermoplastic material (thermoplastic rubbers and optionally ionomers) in the composition of the invention is to lower the viscosity of the mix at temperatures below the vulcanisation temperature, and thus to allow the processing through a conventional extruder.

Another crucial step of the process of the invention is the grinding or granulating and the blending of granulates. Actually, these steps are only possible if the material after extrusion and cooling does not remain tacky. This is the reason why thermoplastic elastomers were added to the formulation. Thermoplastic elastomers and optionally ionomers are needed to allow the processing through conventional PVC equipments and are selected from the range of those which may enhance the final characteristics of the covering; for instance ionomers can optionally improve the abrasion resistance while high styrene content styrene butadiene copolymer will improve the stiffness of the covering, i.e. a key feature for an easy installation of the floor covering.

The percentage of each component will be a fine balance between the processing, the requested features of the covering and the overall price of the whole formulation.

Definitions and Raw Material Description $1^{st}$ Polymer Component: Block Copolymer of SBS SBS or styrene butadiene styrene is considered as a thermoplastic elastomer that can be converted in extrusion equipments for thermoplastics.

The following materials fall under this definition and present possible polymer examples for the present invention:

Finaclear® 602D —Total Petrochemicals, block copolymer of SBS containing 40 wt % styrene Tufprene® A—Asahi Kasei Chemicals, block copolymer of SBS containing 40 wt % styrene Europrene® SOL T 6414—Polimeri Europe, Copolymer of SBS containing 40 wt % styrene Asaprene® T-438—Asahi Kasei Chemicals, block copolymer of SBS containing 35 wt % styrene Asaprene® T-439—Asahi Kasei Chemicals, block copolymer of SBS containing 45 wt % styrene Calprene® C-540—Dynasol, Total Petrochemicals, block copolymer of SBS containing 40 wt % styrene $2^{nd}$ Polymer Component: SBR or NBR SBR or NBR are traditional rubbers. In the case of SBR, a random or at least partially random copolymer of butadiene and styrene containing generally 40 wt % or less of styrene is meant.

The following materials fall under this definition and present possible polymer examples for the present invention:

Plioflex® 1502—Goodyear, random copolymer of SBR containing 23.5 wt % styrene

Plioflex® 1507—Goodyear, random copolymer of SBR containing 23.5 wt % styrene

Europrene® SOL 1205—Polimeri Europe, Partial random copolymer of SBR containing 25 wt % styrene Nitriflex® SB 4022—Nitriflex, random copolymer of SBR containing 23 wt % styrene Europrene® 1509—Polimeri Europe, random copolymer of SBR containing 23.5 wt % styrene Europrene® 1739—Polimeri Europe, random copolymer of SBR containing 40 wt % styrene Kralex® 1507—Kaucuk, Polimeri Europe, random copolymer of SBR containing 23.5 wt % styrene Kralex® 1502—Kaucuk, Polimeri Europe, random copolymer of SBR containing 23.5 wt % styrene Europrene® 1502—Polimeri Europe, random copolymer of SBR containing 23.5 wt % styrene KER 1507—Dwory, Polimeri Europe, random copolymer of SBR containing 23.5 wt % styrene Nitrile Butadiene Rubber: NBR Europrene® N 2845—Polimeri Europe, nitrile butadiene rubber Europrene® N 3945—Polimeri Europe, nitrile butadiene rubber Europrene® N 3330—Polimeri Europe, nitrile butadiene rubber
Nitriclean 3330—Nitriflex, nitrile butadiene rubber
Nitriclean 2830—Nitriflex, nitrile butadiene rubber
High Styrene Content Styrene Butadiene Copolymer: HSR In the case of HSR, a high styrene content copolymer of butadiene and styrene is meant. These molecules are close to SBR but contain generally at least 55 wt % of bounded styrene.

The following materials fall under this definition and present possible polymer examples for the present invention:
Europrene® HS 630—Polimeri Europe, random copolymer of SBR containing 63 wt % styrene
KER 1904—Dwory, random copolymer of SBR containing 63 wt % styrene
Krylene® HS 260—Lanxess, random copolymer of SBR containing 63 wt % styrene
Pliolite® S6H—Eliokem, random copolymer of SBR containing 82.5 wt % styrene
Nitriflex® S-6H—Nitriflex, random copolymer of SBR containing 83 wt % styrene Ionomers The ionomer examples according to the present invention are at least partially neutralized acid copolymers or terpolymers.
Surlyn® 6320—Dupont, ethylene/methacrylic acid incorporating a third comonomer
Surlyn® 8320—Dupont, ethylene/methacrylic acid incorporating a third comonomer
Surlyn® 8120—Dupont, ethylene/methacrylic acid copolymer
Surlyn® 9320—Dupont, ethylene/methacrylic acid incorporating a third comonomer
Iotek® 7510—Exxonmobil, ethylene acrylic acid terpolymer
Iotek® 7520—Exxonmobil, ethylene acrylic acid terpolymer
Iotek® 7410-Exxonmobil, ethylene acrylic acid copolymer Filler (Clays, Aluminium Trihydrate, Carbonates, . . . )
Kaolin® OT 76—Westcoast Trade Nordic, clay
Devolite®—Imerys, clay
Vulkasil® S/KG—Lanxess, silica
Ultrasil® VN3—Degussa, silica
Perkasil® KS 408-PD—Grace Davidsson, silica
Myanit® A20—Björka Mineral, dolomite
Myanit® A10—Björka Mineral, dolomite
Martinal® char 42—Martinswerk, ATH
Martinal® ON 313—Martinswerk, ATH
Mikhart® 10—Provencale, calcium carbonate
Reasorb® 90—Vereinigte Kreidewerke Dammann, calcium carbonate Vulcanisation Systems
Vulkacit® ZBEC—Lanxess, ZBEC
Vulkacit® NZ-EGC—Lanxess, TBBS
Perkacit® ZBEC—Flexsys, ZBEC
Perkacit® TBBS—Flexsys, TBBS
Rubenamid® T—General Quimica, TBBS Additives
Unislip® 1757—Unichema, oleamide
Deolink® TESPT—DOG, silane
HP-669-S—o. Sundström, silane
Hostanox® O10—Clariant, antioxidant.
Irganox® 1076—Ciba, antioxidant
Irganox® 1010—Ciba, antioxidant

EXAMPLE 1

A first dry mix of the following ingredients were performed in wt %: (mixing conditions: 200 kg, 5 min.)
16% SBS (Finaclear® 602D —Total Petrochemicals)
16% SBR (Kralex® 1507—Kaucuk)
16% HSR (KER 1904—Dwory)
3% ionomer (Iotek® 7510—Exxonmobil)
1% processing aid (Unislip® 1757—Unichema)
1% compatibilizer (Deolink® TESPT—DOG)

A second dry mix of the following ingredients were then performed in wt %: (mixing conditions: 250 kg, 5 min.)
27% aluminium trihydrate (Martinal® ON313—Martinswerk)
7% silica (Vulkasil® S/kg—Lanxess)
2% sulfur (SV1905—Univar)
0.4% TBBS (Vulkacit® NZ-EGC—Lanxess)
0.3% ZBEC (Vulkacit ZBEC/C—Lanxess)
3% ZnO (Zinkweiss Harzsiegel CF—Norzinco)
1% polyglycol 3350 P—Clariant
3% silicon oil (Rhodorsil 47 V 30.000—Rhodia)
0.6% antioxidant (Irganox 1076—Ciba)
0.5% stearic acid (Tefacid—Tefac)
2% titanium dioxide
0.2% colour pigments The first and the second dry mix are fed into a double screw extruder Werner & Pfleiderer ZSK and mixed with various pigments at a material temperature below 120° C. and subsequently granulated and cooled by air to room temperature.

The various coloured batches are then mixed again according to the design requests.

The mixed colour batches are then fed into a double belt press and heated up to 170° C. to be vulcanised.

Remark: This composition exhibits good processing ability and very good scratch resistance (see Table 1).

EXAMPLE 2

This example was performed in the same way as Example 1 except that the polymer proportions were modified, in particular the SBS content was heavily decreased and the ionomer content heavily increased:
5% SBS (Finaclear® 602D—Total Petrochemicals),
15% SBR (Kralex® 1507—Kaucuk)
19% HSR (KER 1904—Dwory)
12% ionomer (Iotek® 7510—Exxonmobil)
Remark: This composition exhibits good processing ability and excellent scratch resistance.

EXAMPLE 3

This example was performed in the same way as Example 1 except that the polymer proportions were modified, in particular the SBS content was heavily increased and the SBR content heavily decreased:
30% SBS (Finaclear® 602D—Total Petrochemicals),
6% SBR (Kralex® 1507—Kaucuk)
10% HSR (KER 1904—Dwory)
5% ionomer (Iotek® 7510—Exxonmobil)
Remark: Good processing ability and acceptable properties.

EXAMPLE 4

This example was performed in the same way as Example 1 except that the polymer proportions were modified, in particular a low proportion of HSR were tested:

19% SBS (Finaclear® 602D—Total Petrochemicals)
15% SBR (Kralex® 1507—Kaucuk)
5% HSR (KER 1904—Dwory)
12% ionomer (Iotek® 7510—Exxonmobil)
Remark: Good processing ability and very good scratch resistance.

EXAMPLE 5

This example was performed in the same way as Example 1 except that the polymer proportions were modified, in particular a high proportion of HSR and a low proportion of SBR were tested:
10% SBS (Finaclear® 602D—Total Petrochemicals),
6% SBR (Kralex® 1507—Kaucuk)
30% HSR (KER 1904—Dwory)
5% ionomer (Iotek® 7510—Exxonmobil)
Remark: Good processing ability and acceptable properties

EXAMPLE 6

This example was performed in the same way as Example 1 except that the polymer proportions were modified, in particular a very high proportion of ionomer and a low proportion of SBR were tested:
12% SBS (Finaclear® 602D—Total Petrochemicals),
7% SBR (Kralex® 1507—Kaucuk)
12% HSR (KER 1904—Dwory)
20% Ionomer (Iotek® 7510—Exxonmobil)
Remark: Not as good processing ability and excellent scratch resistance.

EXAMPLE 7

This example was performed in the same way as Example 1 except that the polymer proportions were modified, in particular a very low proportion of an alternative ionomer and a lower proportion of SBR were tested:
19% SBS (Finaclear 602D—Total Petrochemicals)
11% SBR (Kralex 1507—Kaucuk) was added and
18% HSR (KER 1904—Dwory) and
3% Ionomer (Surlyn® 9320—Dupont)
Remark: Good processing ability and acceptable properties

EXAMPLE 8

This example was performed in the same way as Example 1 except that the polymer proportions were modified, in particular a lower proportion of SBS and a lower proportion of HSR combined with a higher proportion of SBR were tested:
11% SBS (Finaclear® 602D—Total Petrochemicals)
25% SBR (Kralex® 1507—Kaucuk)
9% HSR (KER 1904—Dwory)
6% ionomer (Iotek® 7510—Exxonmobil)
Remark: Excellent scratch resistance but too low in castor chair test and too soft.

EXAMPLE 9

This example was performed in the same way as Example 1 except that the polymer proportions were modified, in particular a high proportion of ionomer and a lower proportion of SBR were tested:
19% SBS (Finaclear® 602D—Total Petrochemicals)
5% SBR (Kralex® 1507—Kaucuk)
16% HSR (KER 1904—Dwory)
11% ionomer (Iotek® 7510—Exxonmobil)
Remark: Good processing ability and very good scratch resistance.

EXAMPLE 10

This example was performed in the same way as Example 1 except that the polymer proportions and nature were modified, in particular a high proportion of ionomer and a low proportion of NBR were tested, the NBR replacing the former SBR:
19% SBS (Finaclear® 602D—Total Petrochemicals)
5% NBR (Europrene® N 2845—Polimeri Europe)
16% HSR (KER 1904—Dwory)
11% ionomer (Iotek® 7510—Exxonmobil)
Remark: Good processing ability and very good scratch resistance.

EXAMPLE 11

This example was performed in the same way as Example 1 except that the polymer proportions were modified, in particular a very high proportion of NBR and a lower proportion of SBS together with a lower proportion of ionomer were tested:
13% SBS (Finaclear® 602D—Total Petrochemicals),
20% NBR (Europrene® N 2845—Polimeri Europe)
11% HSR (KER 1904—Dwory)
7% ionomer (Iotek® 7510—Exxonmobil)
Remark: Poor processing ability.

EXAMPLE 12

Example 12 is identical to Example 1 except that the quantity of filler was increased and the nature of the filler was modified:
27% ATH (Martinal® ON313—Martinswerk)
7% silica (Vulkasil® S/kg—Lanxess)
11% kaolin (Devolite®—Imerys)
In this example, the proportion of polymers is reduced proportionally to the increase of filler.
Remark: Not as good in processing ability and in scratch resistance.

EXAMPLE 13

Example 13 is identical to Example 1 except that the global filler amount was reduced:
18% aluminium trihydrate (Martinal ON313—Martinswerk)
7% silica (Vulkasil S/kg—Lanxess)
In this example the proportion of polymers is increased proportionally.
Remark: Not as good in processing ability and in scratch resistance.

EXAMPLE 14

Example 14 is identical to Example 1 except that Kralex 1507, Kaucuk, containing 23.5 wt % styrene has been replaced by Europrene 1739 containing 40 wt % of styrene.
Remark: Correct processing ability and acceptable properties

EXAMPLE 15

This example was performed in the same way than Example 1 except that the polymer proportions were modified, in particular a lower proportion of SBS and a lower proportion of HSR combined with a higher proportion of SBR were tested:
   13% SBS (Finaclear® 602D—otal Petrochemicals),
   20% SBR (Kralex® 1507—Kaucuk)
   11% HSR (KER 1904—Dwory)
   7% Ionomer (Iotek® 7510—Exxonmobil)
Remark: Not as good processing ability, very good scratch resistance.

EXAMPLE 16

This example was performed in the same way than Example 1 except that the Ionomer was excluded:
   17% SBS (Finaclear® 602D—Total Petrochemicals),
   17% SBR (Kralex® 1507—Kaucuk)
   17% HSR (KER 1904—Dwory)
Remark: Not as good in scratch resistance.

EXAMPLE 17

This example was performed in the same way than Example 1 except that the polymer proportions were modified and the Ionomer was excluded:
   21% SBS (Finaclear® 602D—Total Petrochemicals),
   8% SBR (Kralex® 1507—Kaucuk)
   22% HSR (KER 1904—Dwory)
Remark: Not as good in scratch resistance

EXAMPLE 18

This example was performed in the same way than Example 1 except that the polymer proportions were modified and the Ionomer was excluded:
   13% SBS (Finaclear® 602D—Total Petrochemicals),
   20% SBR (Kralex® 1507—Kaucuk)
   18% HSR (KER 1904—Dwory)
Remark: Not as good in scratch resistance.

Test Methods

Examples 1 to 15 have been tested according to partially specific testing methods of the inventor that can be shortly described as follows:

Scratch Resistance

The apparatus with the scratching tool is placed over the sample so that a wagon can be pulled across the surface. The applied force starts with 0.5N and increase 0.5N each time until a scratch appears. The results are expressed as load (N) resulting in a scratch that can be seen corresponding to the first value in Table 1 and load (N) resulting in a scratch that can be felt corresponding to the second value in Table 1.

Stiffness

The stiffness of a material is measured with a Clash & Berg stiffness tester. The sample is fixed by specimen grips, put in a water container and subjected to rotation. One side of the sample is under the subject of torsional moment. The angle is recorded after the test.

Friction

Friction is measured with a modified Tortus friction tester. Instead of using the measuring foot, a sled is fastened to the machine by a line. The force required to drag the sled over the surface of the sample with the motor of the machine is recorded as the friction value.

Stain Resistance

The test is used for determining the stain resistance against water-, alcohol- and oil-soluble colorants of a flooring sample. Put two drops of each staining agent of the surface and cover each staining agent with a watch glass. Remove the watch glasses after the test and clean the surface with the cleaning agents. The remaining stains are visually evaluated.

Castor Chair

The test is based on EN 425 for determining the change of appearance and stability of a flooring material. The sample is fixed on the moving board by using adhesive, but by not fixing a certain area (10*20 cm), dimensional changes can appear when the material expands. About 25.000 rotations are performed on each sample. Any change of appearance or dimensional changes are recorded.

TABLE 1

Test results of the examples

| Properties | Ex. 1 | Ex. 2 | Ex. 3 | Ex. 4 | Ex. 5 | Ex. 6 | Ex. 7 | Ex. 8 | Demands |
|---|---|---|---|---|---|---|---|---|---|
| Scratch resistance T8175 | | | | | | | | | |
| Visible (N) | 2.5 | 2.5 | 2 | 2 | 2 | 2.5 | 2 | 2 | ≧2 |
| To be felt (N) | 4.5 | 5 | 4 | 5 | 3.5 | 5.5 | 4 | 5.5 | ≧3 |
|  | Very good | Excellent | Good | Very good | Good | Excellent | Good | Excellent | ** |
| Castor chair, T8233 | Ok | Ok | Ok | Ok | Ok | Ok | Ok | Not ok | Ok |
| Stiffness, T5016 | 146 | 121 | 95 | 113 | 90 | 96 | 120 | 159 | 90-150 * |
| Hardness, (Shore A) | 84 | 86 | 85 | 84 | 88 | 86 | 85 | 81 | >83 |
| Friction, T5031 | 1.3 | 1.5 | 2.0 | 1.7 | 1.3 | 1.8 | 2.0 | 2.1 | 1.3-2.0 |
| Stain resistance, T6002 | Good | Good | Good | Good | Good | Good | Good | Good | |
| Processing ability | Good | Good | Good | Good | Good | Less good | Good | Less good | |
| Global evaluation of properties | Ok | Ok | Ok | Ok | Ok | Ok | Ok | Not ok | Ok |

| Properties | Ex. 9 | Ex. 10 | Ex. 11 | Ex. 12 | Ex. 13 | Ex. 14 | Ex. 15 | Demands |
|---|---|---|---|---|---|---|---|---|
| Scratch resistance T8175 | | | | | | | | |
| Visible (N) | 2 | 2 | 2 | 2 | 2 | 2 | 2 | ≧2 |
| To be felt (N) | 5 | 5 | 4.5 | 3 | 4.5 | 4 | 5 | ≧3 |
|  | Very good | Very good | Good | Less good | Good | Good | Very good | ** |
| Castor chair, T8233 | Ok | Ok | Ok | Ok | Ok | Ok | Ok | Ok |
| Stiffness, T5016 | 103 | 115 | 140 | 90 | 149 | 130 | 147 | 90-150 * |
| Hardness, (Shore A) | 85 | 84 | 84 | 88 | 83 | 84 | 83 | >83 |

TABLE 1-continued

Test results of the examples

| | | | | | | | | |
|---|---|---|---|---|---|---|---|---|
| Friction, T5031 | 2.0 | 2.0 | 2.0 | 1.6 | 1.30 | 1.3 | 1.9 | 1.3-2.0 |
| Stain resistance, T6002 | Good | Good | Good | Good | Good | Less good | Good | |
| Process ability | Good | Good | Less good | Less good | Good | Good | Less good | |
| Total evaluation of properties | Ok | Ok | Ok | Ok | Ok | Ok | Ok | Ok |

| Properties | Ex. 16 | Ex. 17 | Ex. 18 | Demands |
|---|---|---|---|---|
| Scratch resistance T8175 | | | | |
| Visible (N) | 2 | 2 | 2 | ≧2 |
| To be felt (N) | 3 | 3 | 3 | ≧3 |
| | Less good | Less good | Less good | ** |
| Castor chair, T8233 | Ok | Ok | Ok | Ok |
| Stiffness, T5016 | 147 | 120 | 135 | 90-150 * |
| Hardness, (Shore A) | 83 | 86 | 84 | >83 |
| Friction, T5031 | 1.7 | 1.5 | 1.9 | 1.3-2.0 |
| Stain resistance, T6002 | Less good | Less good | Less good | |
| Processing ability | Good | Good | Good | |
| Global evaluation | Ok | Ok | Ok | Ok |

\* Low value = stiffer material, High value = softer material
\*\* Graduation scale: Not acceptable, Less good, Good, Very good, Excellent

The invention claimed is:

1. A decorative surface covering obtained from a vulcanisable composition, said composition comprising:
    a first polymer component being a poly (styrene-butadiene-styrene) polymer;
    a second polymer component having 40 wt % or less of bound styrene, selected from the group consisting of a random or partially random copolymer of butadiene and styrene, and nitrile butadiene rubber;
    a third polymer component consisting of a high styrene content styrene butadiene copolymer containing at least 55% of bound styrene;
    a filler;
    a vulcanisation system;
    additives selected from the group consisting of processing aids, stabilizers, pigments and compatibilizers.

2. The decorative surface covering according to claim 1 further comprising a fourth polymer component being an ionomer.

3. The decorative surface covering according to claim 2, wherein the ionomer represents between 3 to 12 wt % of the total weight of the composition.

4. The decorative surface covering according to claim 3, wherein the ionomer is selected from the group consisting of partially or totally neutralised ethylene/methacrylic acids incorporating a third comonomer.

5. The decorative surface covering according to claim 1, wherein the first polymer component is a styrene butadiene styrene block copolymer containing 35 to 45 wt % of bound styrene.

6. The decorative surface covering according to claim 1, wherein the first polymer component is a styrene butadiene styrene block copolymer containing 40 wt % of bound styrene.

7. The decorative surface covering according to claim 1, wherein the second polymer component is a random or a partially random copolymer of butadiene and styrene, containing 25 wt % of bound styrene.

8. The decorative surface covering according to claim 1, wherein third polymer component is a high styrene content styrene butadiene copolymer containing between 63 and 83 wt % of bound styrene.

9. The decorative surface covering according to claim 1, wherein the third polymer component is a high styrene content styrene butadiene copolymer containing 63 wt % of bound styrene.

10. The decorative surface covering according to claim 1, wherein the composition comprises the following wt % relative to the total amount of the ingredients:
    5 to 30 wt % of the first polymer component;
    5 to 20 wt % of the second polymer component;
    5 to 30 wt % of the third polymer component.

11. The decorative surface covering according to claim 1, wherein the filler is selected from the group consisting of aluminium trihydrate, silica, clay, dolomite and calcium carbonate.

12. The decorative surface covering according to claim 1, wherein the composition comprises between 25 and 45 wt % of filler.

13. The decorative surface covering according to claim 1, wherein said composition is substantially halogen-free.

14. The decorative surface covering according to claim 1, wherein the vulcanisation system is selected from the group consisting of sulphur, stearic acids, zinc oxide, sulfenamides and thiocarbamate or combinations thereof.

15. The decorative surface covering according to claim 1, wherein said surface covering additionally comprises a polyurethane-based top coating.

16. The decorative surface covering according to claim 15, wherein said polyurethane based top coating is a polyurethane acrylate.

17. A process for manufacturing the decorative surface covering composition according to claim 1 comprising the following steps:
- performing a first dry mix comprising all the polymer components;
- performing a second dry mix comprising the fillers, the vulcanisation system, the stabilisers, the pigments and the processing aids;
- mixing the first and the second dry mix in an extruder wherein the mass temperature does not exceed 120°C and granulating it to a specific colour batch;
- repeating the extruder mixing step with different colours to achieve various colour batches;
- performing a dry mix of the various colour batches;
- feeding the dry mix comprising the various colour batches in a double belt press and heat it up to at least 160°C to vulcanise it.

18. A process according to claim 17, wherein the step of dry mix comprising the various colour batches comprises the adding of additionally virgin styrene butadiene styrene granules.

19. A process according to claim 18, wherein an additional PU-based top coating is applied as a finish on the decorative surface covering.

* * * * *